United States Patent [19]

O'Connor et al.

[11] Patent Number: 4,522,975

[45] Date of Patent: Jun. 11, 1985

[54] SELECT NCO-TERMINATED, URETDIONE GROUP-CONTAINING POLYURETHANE PREPOLYMERS AND LIGNOCELLULOSIC COMPOSITE MATERIALS PREPARED THEREFROM

[75] Inventors: James M. O'Connor, Clinton; Theodore C. Kraus, Cheshire; Wilhelm J. Schnabel, Branford, all of Conn.

[73] Assignee: Olin Corporation, Cheshire, Conn.

[21] Appl. No.: 616,453

[22] Filed: Jun. 1, 1984

[51] Int. Cl.$^3$ ............... C08L 75/00; C08G 18/74
[52] U.S. Cl. ................ 524/702; 427/385.5; 427/389; 528/67; 528/73
[58] Field of Search ............ 528/73, 67; 524/702; 427/385.5, 389

[56] References Cited

U.S. PATENT DOCUMENTS

| | | | |
|---|---|---|---|
| 3,099,642 | 7/1963 | Holtschmidt et al. | 528/64 |
| 3,248,370 | 4/1966 | Reischl et al. | 528/73 |
| 3,897,581 | 7/1975 | Nakatsuka et al. | 521/102 |
| 3,923,713 | 12/1975 | Hermann | 528/69 |
| 3,993,641 | 11/1976 | Tiemann et al. | 260/239 A |
| 4,044,171 | 8/1977 | Muller et al. | 427/27 |
| 4,238,378 | 12/1980 | Markusch et al. | 528/67 |
| 4,336,365 | 6/1982 | Reischl et al. | 526/230 |
| 4,413,079 | 11/1983 | Disteldorf et al. | 528/59 |

FOREIGN PATENT DOCUMENTS 944309 12/1963 United Kingdom .

OTHER PUBLICATIONS

Saunders et al., *Polyurethanes*, Part I, Interscience, N.Y., 1962, pp. 91-94.

*Primary Examiner*—Maurice J. Welsh
*Attorney, Agent, or Firm*—William D. Sabo

[57] ABSTRACT

Select NCO-terminated, uretdione group-containing polyurethane prepolymers are prepared by reacting a uretdione group-containing organic polyisocyanate with an isocyanate reactive hydrogen atom-containing compound, employing a select equivalent ratio of NCO to OH ranging from about 1.5/1 to about 2/1. The polyurethane prepolymers are useful in the preparation of lignocellulosic composite materials, such as particle board, and in making coatings.

19 Claims, No Drawings

SELECT NCO-TERMINATED, URETDIONE GROUP-CONTAINING POLYURETHANE PREPOLYMERS AND LIGNOCELLULOSIC COMPOSITE MATERIALS PREPARED THEREFROM

This invention relates to select NCO-terminated, uretdione group-containing polyurethane prepolymers and to their use in the preparation of lignocellulosic composite materials and coatings.

It is known in the art to use an organic polyisocyanate, as a binder, or as a component of a binder, in the manufacture of lignocellulosic composite materials, such as particle board, chip board, wafer board, plywood, and so forth. The resulting composite materials generally demonstrate excellent internal bonding properties due to the strong adhesive characteristics of the organic polyisocyanates.

However, the use of polyisocyanate-based binders has not become widespread in the industry for a variety of reasons. One serious drawback is that polyisocyanates are inherently toxic, making their handling and use onerous.

To overcome the problems of handling these materials, so called "blocked" isocyanates have been developed. These can be prepared, for example, by reacting NCO-groups of the polyisocyanate with a suitalbe blocking agent, such as phenol. However, these blocked isocyanates present another drawback in their actual use. The blocking agents, which are released at elevated temperatures, are difficult to remove during or after the application process; and their presence may detrimentally affect the properties of the final products, e.g. by producing blisters in coatings, etc.

Now, according to the invention, it has been discovered that the foregoing problems can be overcome by using a select NCO-terminated, uretdione group-containing polyurethane prepolymer. In accordance with the invention, the polyurethane prepolymer is prepared by reacting a uretdione group-containing organic polyisocyanate with an isocyanate reactive hydrogen atom-containing compound, employing a select equivalent ratio of NCO to OH ranging from about 1.5/1 to about 2/1. The resulting reaction product contains a uretdione group which, upon heating, is cleaved to provide free isocyanate groups, which may react with available hydroxyl groups to form urethane polymers of high molecular weight. In the practice of the invention, the select NCO-terminated, uretdione group-containing polyurethane prepolymer is used in preparing lignocellulosic composite materials demonstrating desirable bonding properties, without requiring the cumbersome separation of blocking agents.

In accordance with the invention, the select NCO-terminated, uretdione group-containing polyurethane prepolymer is prepared by reacting a uretdione group-containing organic polyisocyanate with an isocyanate reactive hydrogen atom-containing compound in an equivalent ratio of NCO to OH ranging from about 1.5/1 to about 2/1 to yield an NCO-terminated polyurethane prepolymer of controlled molecular weight. Preferably, the equivalent ratio of NCO to OH ranges from about 1.7/1 to about 2/1.

In preparing the select NCO-terminated, uretdione group-containing polyurethane prepolymer, any suitable organic polyisocyanate containing a uretdione group may be used. These uretdione group-containing organic polyisocyanates can be prepared in accordance with well-known methods by dimerization of the corresponding organic polyisocyanate. See Saunders, J. H. and Frisch, K. C., *Polyurethane: Chemistry and Technology, Part I*, pages 91–94 (1962). Any suitable dimerization catalyst can be employed, such as phosphines, e.g. trialkylphosphines, tertiary amines, e.g. pyridine, etc. The reaction temperature and time can be varied broadly over wide ranges, depending on the polyisocyanate to be dimerized, the nature and amount of the catalyst employed, and so forth. Dimerization may also be carried out in the absence of a catalyst at elevated temperatures, generally above about 120° C. In carrying out the dimerization reaction, a suitable inert organic solvent may be utilized, although the reaction may also be performed in the absence of a solvent.

Any suitable organic polyisocyanate, or mixture of polyisocyanates, which is susceptible to dimerization can be used. Typical examples include the following and mixtures thereof: 2,4-toluene diisocyanate; 2,6-toluene diiosycanate; isomeric mixtures of 2,4- and 2,6-toluene diisocyanate; ethylene diisocyanate; propylene diisocyanate; methylene-bis (4-phenyl isocyanate); methylene-bis (4-cyclohexyl) isocyanate; xylene diisocyanate; 3,3'-bitoluene-4-4'-diisocyanate; hexamethylene diisocyanate; naphthalene 1,5-diisocyanate; isophorone diisocyanate; and the like. Preferred organic polyisocyanates include: 2,4-toluene diisocyanate; 2,6-toluene diisocyanate; isomeric mixtures of 2,4- and 2,6-toluene diisocyanate in which the weight ratio of the 2,4-isomer to the 2,6-isomer is from about 60:40 to about 90:10, and more preferably from about 65:35 to about 80:20; and methylene-bis (4-phenyl isocyanate). In accordance with a particularly preferred embodiment of the invention, 2,4-toluene diisocyanate is employed.

The isocyanate reactive hydrogen atom-containing compound preferably should have an equivalent weight of less than about 500, and more preferably of less than about 350. The average functionality usually ranges from about 2 to about 8, and preferably from about 2 to about 4.

Suitable isocyanate reactive hydrogen atom-containing compounds include low molecular weight compounds having at least two isocyanate reactive hydrogen atoms and an equivalent weight from about 31 to about 100, polyester polyols, polyether polyols and mixtures of two or more such compounds. Examples of such low molecular weight compounds include: ethylene glycol, 1,2-propylene glycol, 1,3-propylene glycol, 2,3-butylene glycol, 1,5-pentane diol, 1,6-hexane diol, neopentyl glycol, glycerol, trimethylolpropane, trimethylolhexane, pentaerythritol, methyl glucoside, sorbitol, monoethanolamine, diethanolamine, triethanolamine, and the like, and mixtures thereof.

The polyester polyols include the products of reacting polycarboxylic acids with polyhydric alcohols. Illustrative polycarboxylic acids include, for example, oxalic, malonic, succinic, glutaric, adipic, pimelic, suberic, azelaic, terephthalic, and the like, and mixtures thereof. Illustrative polyhydric alcohols include various diols, triols, tetrols and higher functionality alcohols, such as ethylene glycol, 1,2-propylene glycol, 1,3-propylene glycol, 2,3-butylene glycol, 1,5-pentane diol, 1,6-hexane diol, neopentyl glycol, glycerol, trimethylolpropane, trimethylolhexane, pentaerythritol, methyl glucoside, sorbitol, and the like, and mixtures thereof. In a particularly preferred embodiment of the invention, the polyester polyol is derived from terephthalic acid.

Suitable polyether polyols include various polyoxyalkylene polyols and mixtures thereof. These can be prepared, according to well-known methods, by condensing an alkylene oxide, or a mixture of alkylene oxides using random or step-wise addition with a polyhydric initiator or a mixture of polyhydric initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture of propylene oxide with ethylene oxide using random or step-wise oxyalkylation.

The polyhydric initiator used in preparing the polyether polyol reactant includes the following and mixtures thereof: (a) aliphatic diols, such as ethylene glycol, 1,2-propylene glycol, 1,3-propylene glycol, 2,3-butylene glycol, 1,5-pentane diol, and the like; (b) aliphatic triols, such as glycerol, trimethylolpropane, triethylolpropane, trimethylolhexane, and the like; (c) higher functionality alcohols, such as pentaerythritol, methyl glucoside, sorbitol, and the like; (d) polyamines, such as tetraethylene diamine; and (e) alkanolamines, such as diethanolamine, triethanolamine, and the like.

A preferred group of polyhydric initiators for use in preparing the polyether polyol reactant is one which comprises a carbohydrate or a carbohydrate derivative (e.g., methyl glucoside). In a particularly preferred embodiment, the polyhydric initiator includes a mixture of a carbohydrate or a carbohydrate derivative with at least one aliphatic diol or triol. Exemplificative of the latter are water, ethylene glycol, propylene glycol, the butylene glycols, glycerol, trimethylolpropane, triethylolpropane, the alkanolamines, and the like, and mixtures thereof.

The most preferred group of polyhydric initiators for use in preparing the polyether polyol reactant is one which comprises mixtures of methyl glucoside with an aliphatic triol, preferably glycerol.

In preparing the polyether polyol, the oxyalkylation reaction is allowed to proceed until the desired equivalent weight is reached, at which time the reaction is terminated and the resulting polyol is recovered. As noted above, the equivalent weight of the resulting polyether polyol is less than about 500, and preferably less than about 350; more preferably, the polyether polyol has an equivalent weight from about 100 to about 200.

Preferably, the reaction between the uretdione group-containing organic polyisocyanate and the isocyanate reactive hydrogen atom-containing compound is carried out in the presence of a suitable organic solvent. A wide range of solvents may be employed and, in fact, any inert organic solvent in which the reactants are relatively soluble can be used. Useful solvents include, for example, monochlorobenzene, o-dichlorobenzene, p-dichlorobenzene, tetrahydronaphthalene, benzene, toluene, xylene, the chlorotoluenes, the trichlorobenzenes, carbon tetrachloride, trichloroethylene, tetrahydrofuran, etc. Common urethane catalysts, e.g., tertiary amines and metal compounds such as stannous octoate, dibutyltin dilaurate or dibutyl (lauryl mercapto) tin, may be used to accelerate the reaction. The actual reaction conditions such as temperature and time may vary over wide ranges. Generally, a reaction temperature from about 50° C. to about 120° C., and preferably from about 60° C. to about 110° C., is employed. The reaction time may vary considerably depending generally on the temperature so as to insure a completion of the reaction.

The described select NCO-terminated, uretdione group-containing polyurethane prepolymer is used in the manufacture of lignocellulosic composite materials. The process of the invention is carried out by contacting a plurality of lignocellulosic particles with a binder composition comprising the described polyurethane prepolymer. The contacted particles are thereafter formed into a composite material by the application of heat and pressure.

Particles of any suitable lignocellulosic material may be employed according to the process of the invention. Illustrative materials containing lignocellulose include: wood chips, wood fibers, planar shavings, sawdust, bark, cork and the like, as well as straw, flax, bagasse, bamboo, dried weeds and grasses, corn stalks, hulls from cereal crops such as rice and oats, sisal, and so forth. The moisture content of the lignocellulosic particles typically ranges from about 2 to about 25 percent, and preferably from about 6 to about 20 percent, by weight.

For purposes of illustration, the select NCO-terminated, uretdione group-containing polyurethane prepolymer will be used to produce particle board in the description which follows. It is to be understood, however, that the polyurethane prepolymer can be suitably employed in the manufacture of any type of lignocellulosic composite material, such as, for example, chip board, wafer board, fiber board, etc., as will be readily apparent to those skilled in the art.

In the manufacture of particle board, the lignocellulosic particles may be conveniently contacted with the select NCO-terminated, uretdione group-containing polyurethane prepolymer by mixing the particles with the polyurethane prepolymer while the particles are being blended or agitated in an enclosed blender or like mixing apparatus. Any suitable amount of the polyurethane prepolymer may be employed in making particle board according to the process of the invention. Generally speaking, the polyurethane prepolymer is used in a proportion ranging from about 4 to about 40 percent by weight based on the dry weight of the particles. For most applications, it is preferred to employ from about 5 to about 20 percent by weight of the polyurethane prepolymer. If desired, other standard materials, such as fire retardants, pigments, and the like, may also be added to the particles during the blending step.

The treated particles are blended sufficiently to form a uniform mixture, which is then formed into a loose mat or felt. The mat is subsequently placed in a heated press between caul plates and compressed to the desired extent. The actual pressing conditions, i.e. temperature, pressure and time, may vary over wide ranges and are generally dependent on the desired thickness and density of the board being produced, the size of the particles used and other factors familiar to those skilled in the art. In general, however, temperatures ranging from about 250° F. to about 450° F. and pressures ranging from about 400 psi to about 800 psi for a period of about 3 minutes to about 20 minutes are typical.

The above-described process can be carried out batchwise or in a continuous manner, as should be readily apparent to those skilled in the art. It is also within the scope of the invention to apply a release agent to the metal surfaces of the press before a manufacturing run is commenced, if desired. This may aid in insuring that minimal adherence of the particle board to the metal surfaces takes place. Any material known to those in the art as being suitable as a release agent may be employed, e.g. iron, calcium or zinc stearate compounds.

The select NCO-terminated, uretdione group-containing polyurethane prepolymer of the present invention may also be used in conjunction with conventional thermosetting resin binders, such as phenol-formaldehyde, resorcinol-formaldehyde, melamine-formaldehyde, urea-formaldehyde, urea-furfural, and the like. Other modifications should be readily apparent to those skilled in the art.

The lignocellulosic composite materials produced in accordance with the invention have excellent physical properties and may be used in any of the customary areas of application for such materials.

As noted above, the select NCO-terminated, uretdione group-containing polyurethane prepolymer can also be suitably employed as a coating composition. In accordance with the invention, the polyurethane prepolymer is applied to a suitable substrate and cured according to conventional procedures well known to those skilled in the art.

The following examples are provided to further illustrate the invention. All parts and percentages are by weight unless otherwise specified.

PREPARATION OF NCO-TERMINATED, URETDIONE GROUP-CONTAINING POLYURETHANE PREPOLYMERS

EXAMPLE 1

17.4 Grams (0.1 equivalent) of uretdione group-containing diisocyanate[1] were dissolved in 250 ml of refluxing dry tetrahydrofuran (THF) in a 500 ml 3-neck flask equipped with reflux condenser, thermometer and dropping funnel. 8.75 Grams (0.058 equivalent) of a polyol[2] dissolved in 50 ml of dry THF was added slowly with magnetic stirring to the mildly refluxing solution. Heating with stirring was continued for several hours to achieve completion of the reaction. After removing the THF solvent, a white crystalline material was obtained melting in the 130°–150° C. range. IR analysis showed that the uretdione-dimer configuration was maintained.

[1] Derived from 2,4-toluene diisocyanate.
[2] This is a polyether polyol having an equivalent weight of about 150 and an average functionality of about 3.8 and prepared by condensing a methyl glucoside/glycerol mixture with propylene oxide to a final hydroxyl number of about 375.

EXAMPLE 2

The procedure of Example 1 was followed, except that the uretdione group-containing diisocyanate was derived from a mixture of toluene diisocyanate isomers (80:20 mixture of 2,4/2,6-isomers). The resulting product showed properties similar to those of the product of Example 1.

EXAMPLE 3

The procedure of Example 1 was followed, except that the polyol was a polyester polyol having an equivalent weight of about 178 and an average functionality of about 2 and was derived from terephthalic acid and ethylene glycol. (Commercially available under the designation "TERATE 203".) The final product was a light brown solid with a relatively low melting range of 90°–130° C.

PREPARATION OF WOOD MOLDINGS

EXAMPLES 4 AND 5

Wood powder[1] and wood chips[2] were admixed with the NCO-terminated, uretdione group-containing polyurethane prepolymers of Examples 1 and 2, respectively. The mixtures were formed into square mats (6"×6") and then placed in a mold preheated to a temperature of 350° F. The mats were subjected to a molding temperature of 350° F. and a pressure of 500–700 psig for 10–15 minutes. The molded products, containing 5–10% of polyurethane prepolymer, demonstrated excellent binding properties.

[1] Commercially avialable from Wilner Wood Products Co., Norway, Maine, as "Grade 139", understood as consisting of white pine wood powder (moisture content: 6%, particle size: 100–200 mesh).
[2] Commercially available from Wilner Wood Products Co., Norway, Maine, under the designation "PINE DRI", understood as consisting of white pine wood (moisture content: 8%, particle size: 8–20 mesh).

EXAMPLE 6

The procedure of Examples 4 and 5 was followed, employing the NCO-terminated, uretdione group-containing polyurethane prepolymer of Example 3. The mold was preheated to a temperature of 250° F. and the mat was subjected to a molding temperature of 250° F. and a pressure of 500–700 psig for 5 minutes. The molded product, containing 10% of polyurethane prepolymer, demonstrated excellent binding properties.

What is claimed is:

1. A process for preparing an NCO-terminated, uretdione group-containing polyurethane prepolymer, comprising reacting a uretdione group-containing organic polyisocyanate with an isocyanate reactive hydrogen atom-containing compound in an equivalent ratio of NCO to OH ranging from about 1.5/1 to about 2/1, said uretdione group-containing organic polyisocyanate being derived from an organic polyisocyanate selected from the group consisting of 2,4-toluene diisocyanate; 2,6-toluene diisocyanate; isomeric mixtures of 2,4- and 2,6-toluene diisocyanate; methylene-bis (4-phenyl isocyanate); xylene diisocyanate; 3,3'-bitoluene-4,4'-diisocyanate; naphthalene 1,5-diisocyanate; and mixtures thereof, and said isocyanate reactive hydrogen atom-containing compound having an equivalent weight of less than about 500 and an average functionality from about 2 to about 8 and being selected from the group consisting of polyester polyols, polyether polyols and mixtures thereof.

2. The process of claim 1, wherein said uretdione group-containing organic polyisocyanate and said isocyanate reactive hydrogen atom-containing compound are reacted in an equivalent ratio of NCO to OH ranging from about 1.7/1 to about 2/1.

3. The process of claim 1, wherein said uretdione group-containing organic polyisocyanate is derived from 2,4-toluene diisocyanate.

4. The process of claim 1, wherein said isocyanate reactive hydrogen atom-containing compound has an equivalent weight of less than about 350 and an average functionality from about 2 to about 4.

5. A process for preparing an NCO-terminated, uretdione group-containing polyurethane prepolymer, comprising reacting a uretdione group-containing organic polyisocyanate with an isocyanate reactive hydrogen atom-containing compound in an equivalent ratio of NCO to OH ranging from about 1.7/1 to about 2/1, said uretdione group-containing organic polyisocyanate being derived from an organic polyisocyanate selected from the group consisting of 2,4-toluene diisocyanate; 2,6-toluene diisocyanate; isomeric mixtures of 2,4- and 2,6-toluene diisocyanate; methylene-bis (4-phenyl isocyanate); xylene diisocyanate; 3,3′-bitoluene-4,4′-diisocyanate; naphthalene 1,5-diisocyanate; and mixtures thereof, and said isocyanate reactive hydrogen atom-containing compound having an equivalent weight of less than about 350 and an average functionality from about 2 to about 4 and being selected from the group consisting of polyester polyols, polyether polyols and mixtures thereof.

6. The process of claim 5, wherein said uretdione group-containing organic polyisocyanate is derived from 2,4-toluene diisocyanate.

7. The process of claim 5, wherein said isocyanate reactive hydrogen atom-containing compound is a polyether polyol having an average equivalent weight from about 100 to about 200 and is prepared by reacting an alkylene oxide, or a mixture of alkylene oxides, with a polyhydric initiator comprising a carbohydrate or a carbohydrate derivative.

8. The process of claim 7, wherein said polyether polyol is prepared by reacting propylene oxide or a mixture of propylene oxide and ethylene oxide with a mixture of methyl glucoside and an aliphatic triol.

9. The process of claim 5, wherein said isocyanate reactive hydrogen atom-containing compound is a polyester polyol which is prepared by reacting a polycarboxylic acid with a polyhydric alcohol.

10. The process of claim 9, wherein said polyester polyol is derived from terephthalic acid.

11. An NCO-terminated, uretdione group-containing polyurethane prepolymer prepared according to the process of claim 1.

12. An NCO-terminated, uretdione group-containing polyurethane prepolymer prepared according to the process of claim 5.

13. An NCO-terminated, uretdione group-containing polyurethane prepolymer prepared according to the process of claim 8.

14. An NCO-terminated, uretdione group-containing polyurethane prepolymer prepared according to the process of claim 10.

15. A process for the preparation of a lignocellulosic composite material, comprising the steps of: contacting a plurality of lignocellulosic particles having a moisture content ranging from about 2 to about 25 percent with a binder composition; and then forming said contacted particles into a composite material by the application of heat and pressure, said binder composition comprising an NCO-terminated, uretdione group-containing polyurethane prepolymer prepared according to the process of claim 1.

16. A process for the preparation of a lignocellulosic composite material, comprising the steps of: contacting a plurality of lignocellulosic particles having a moisture content ranging from about 2 to about 25 percent with a binder composition; and then forming said contacted particles into a composite material by the application of heat and pressure, said binder composition comprising an NCO-terminated, uretdione group-containing polyurethane prepolymer prepared according to the process of claim 5.

17. A process for the preparation of a lignocellulosic composite material, comprising the steps of: contacting a plurality of lignocellulosic particles having a moisture content ranging from about 2 to about 25 percent with a binder composition; and then forming said contacted particles into a composite material by the application of heat and pressure, said binder composition comprising an NCO-terminated, uretdione group-containing polyurethane prepolymer prepared according to the process of claim 8.

18. A process for the preparation of a lignocellulosic composite material, comprising the steps of: contacting a plurality of lignocellulosic particles having a moisture content ranging from about 2 to about 25 percent with a binder composition; and then forming said contacted particles into a composite material by the application of heat and pressure, said binder composition comprising an NCO-terminated, uretdione group-containing polyurethane prepolymer prepared according to the process of claim 10.

19. A process for applying a coating composition to a substrate, said composition comprising an NCO-terminated, uretdione group-containing polyurethane prepolymer prepared according to the process of claim 1.

* * * * *